United States Patent [19]

Tanaka et al.

[11] 4,339,650

[45] Jul. 13, 1982

[54] ELECTRIC DISCHARGE MACHINING APPARATUS

[75] Inventors: Yutaka Tanaka; Takeshi Yatomi; Yoshio Ozaki, all of Aichi, Japan

[73] Assignee: Mitsubishi Denki Kabushiki Kaisha, Tokyo, Japan

[21] Appl. No.: 186,806

[22] Filed: Sep. 12, 1980

[51] Int. Cl.[3] .......... B23P 1/12

[52] U.S. Cl. .......... 219/69 G; 219/69 W

[58] Field of Search .......... 219/69 W, 69 G, 124.03; 318/620, 621

[56] References Cited

U.S. PATENT DOCUMENTS 2,223,177 11/1940 Jones .......... 219/69 G 3,793,502 2/1974 Bell, Jr. .......... 219/69 G 3,989,921 11/1976 Ohi et al. .......... 219/124.03

*Primary Examiner*—C. C. Shaw

*Attorney, Agent, or Firm*—Sughrue, Mion, Zinn, Macpeak and Seas

[57] ABSTRACT

An electric discharge machining apparatus for cutting and shaping a workpiece into an article having a desired configuration in which the period of time required until the speed of a table carrying the workpiece becomes constant is made quite short. Comparator means compares a gap voltage between a wire-shaped electrode and a workpiece with a reference voltage to produce an error voltage. In one embodiment, a non-linear amplifier is disposed between the output of the comparator means and the input of an integrator. In the integrator, a clamping diode is coupled across an integrating capacitor so as to prevent the output of the integrator from becoming negative.

4 Claims, 6 Drawing Figures

4
1
3
POWER SOURCE
14
12
9
5
7
C1
Fx
Eg
-Ee
R1
F
DRIVE CONTROL
2
Eo
Fy
6
10
11

POWER SOURCE
DRIVE CONTROL
Fx
FY
F
C1
R1
-Ee
Eg
Eo

POWER SOURCE
DRIVE CONTROL
OUTPUT
INPUT
R1
C1
F
FX
FY
-Ee
Eg
Eo

POWER SOURCE
DRIVE CONTROL
Fx
FY
F
C1
R1
-Ee
Eg
Eo

ELECTRIC DISCHARGE MACHINING APPARATUS

BACKGROUND OF THE INVENTION

The present invention relates to an apparatus for electric discharge machining which is capable of effectively cutting and shaping a workpiece in a desired configuration with extremely high accuracy.

FIG. 1 is a schematic circuit diagram showing an example of a conventional apparatus for cutting and shaping a workpiece using an electric discharge with a wire-shaped electrode by the use of a voltage-operated servo-control mechanism. The conventional apparatus, as shown in FIG. 1, includes a wire-shaped electrode 1, a workpiece 2 to be cut and shaped into a desired configuration, an electric supply contact 3, an electric power source 4, an error voltage amplifier 5, an operational amplifier 6, resistors 7 and 8 for determining the gain of the system, a drive control device 9, an X-axis drive motor 10, and a Y-axis drive motor 11.

A pulsating current supplied from the electric source 4 is applied through the electric supply contact 3 to the wire-shaped electrode 1 to thereby cause an electrical discharge which is used to machine the workpiece 2. A gap voltage $E_g$ applied between the wire-shaped electrode 1 and the workpiece 2 during the machining operation is applied to the error voltage amplifier 5 where the gap voltage $E_g$ is then compared with a reference voltage $E_o$ to produce an error voltage $-E_e$ representative of a difference therebetween. In this case, $-E_e=-(E_g-E_o)$.

The error voltage $-E_e$ is applied to the operational amplifier 6 where the polarity of the error voltage $-E_e$ is inverted and the resulting signal is applied as a table speed signal F. Reference numerals 7 and 8 designate resistors for determining the gain of the system, the gain being determined by the ratio of the resistance values $R_1$ and $R_2$, specifically $R_2/R_1$. The drive control device 9 operates to divide the table speed signal F into an X-axis component $F_x$ and a Y-axis component $F_y$ where $F=F_x^2+F_y^2$. The values of $F_x$ and $F_y$ are determined according to the contents of an N/C memory tape. The signals $F_x$ and $F_y$ are coupled respectively to control the X-axis drive "motor" 10 and the Y-axis drive motor. In such a voltage-operated servo-control mechanism, if the discharge gap between the wire-shaped electrode 1 and the workpiece 2 is increased, the gap voltage $E_g$ increases resulting in an increase in the error voltage $E_e$. As a result, the table speed signal F increases and the table supporting the workpiece 2 moves in a direction so as to reduce the length of the discharge gap.

On the other hand, if the discharge gap is reduced, the table speed signal F is reduced. Consequently, the table moves in a direction so as to enlarge the discharge gap. That is, with this system, it is possible to maintain the length of the discharge gap constant by maintaining the gap voltage constant during machining. Since the length of the machining gap is always maintained constant, machining of the workpiece with an accuracy higher than that attainable with a system in which the table is always driven at a constant speed is possible.

The operation of the conventional apparatus for driving the electrode employing a voltage servo-control mechanism has been described. In this system, since the table speed F is determined by the error voltage $E_e$ and the gain $R_2/R_1$ of the operational amplifier, it is impossible to make the error voltage $E_e$ equal to zero ($E_e=0$).

In addition to this fact, while the table speed F during the machining can be expressed by:

$$F=(R_2/R_1)\cdot E_e, \tag{1}$$

due to variations in wire tension, variations in specific resistance of the machining liquid which unavoidably occur during the machining operation, directional characteristics of the wire guide and the like, even through the gap voltage during the machining is maintained constant, the table's speed may change slightly. Assuming that the amplitude variation of the table speed is $\Delta F$, from equation (1), $\Delta F$ can be expressed as:

$$\Delta F=(R_2/R_1)\cdot\Delta E_e. \tag{2}$$

Accordingly, the error voltage $E_e$ also varies by $\Delta E_e$. As described hereinbefore, $E_e=E_g-E_o$ and the reference voltage $E_o$ is constant. Therefore, $\Delta E_e=\Delta E_g$. From equation (2), $$\Delta E_e=\Delta F/(R_2/R_1).$$

Thus, $$\Delta E_g=\Delta F/(R_2/R_1). \tag{3}$$

In other words, in the conventional electric discharge machining apparatus with a wire-shaped electrode employing a voltage-operated servo-control mechanism, in order to maintain the gap voltage constant, the table speed is varied. However, if this speed varies $\Delta F$, as indicated by equation (3), the gap voltage varies by $(R_2/R_1)\Delta F$. The variation in the gap voltage results directly in variations in the gap length. This results in a disadvantage that machining with a high accuracy is impossible. From equation (3), it may be seen that, in order to minimize the variation in the gap voltage with respect to that of the table speed, the ratio of $R_2$ and $R_1$ should be increased. However, since the ratio $R_2/R_1$ determines the gain of the voltage-operated servo-control mechanism system, if the gain is increased, the system may be entirely put in an unstable state or the table speed may greatly vary for only a slight disturbance. In view of the above, in the conventional apparatus, the operational amplifier is provided with phase compensating means to increase the real gain $R_2/R_1$ whereby the gap voltage during machining is made as constant as possible. Nonetheless, the conventional apparatus is disadvantageous in that the gain cannot be made infinite and the gap voltage during machining is liable to change thereby resulting in degradation in the machining accuracy.

SUMMARY OF THE INVENTION

In view of the above described drawbacks accompanying the conventional apparatus, an object of the present invention is to provide an improved apparatus for electric discharge machining in which the period of time required until the table speed becomes constant is made quite short.

In accordance with this and other objects of the invention, there is provided an electric discharge machining apparatus for cutting and shaping a workpiece into an article having a desired configuration including an electrode movable relative to the workpiece with a cutting gap formed between the electrode and workpiece. An electric current is applied to the electrode with the current flowing through the cutting gap. Means is provided for moving the electrode and the workpiece relative to one another so as to cut and shape the workpiece into a desired configuration. Comparator means compares a voltage across the cutting gap with a reference voltage to produce an error voltage signal. In one preferred embodiment of the invention, a non-linear amplifier is coupled between the output of the comparator means and an integrating means with the amplifier having a fast response characteristic with respect to changes in the error voltage. By "fast response characteristic" is meant that the output of the non-linear amplifier rises very rapidly for relatively small increases in input voltage over a predetermined region of operation. The speed of the electrode relative to the workpiece is controlled in accordance with the output of the integrating means. In another embodiment, means is provided for maintaining the output of the integrating means at a substantially zero level when the integrated value tends to shift toward a negative level. Preferably, the maintaining means is implemented by a clamping diode connected in parallel with an integrating capacitor. If desired, both means for maintaining the output of the integrating means at a substantially zero level and a non-linear amplifier can be provided in a single embodiment. The electrode may either be a wire-shaped electrode or a conventional electric discharge machining electrode having a desired configuration.

DESCRIPTION OF THE PREFERRED EMBODIMENTS

Preferred embodiments constructed according to the present invention will be described hereinafter with reference to the accompanying drawings.

Figure 1:
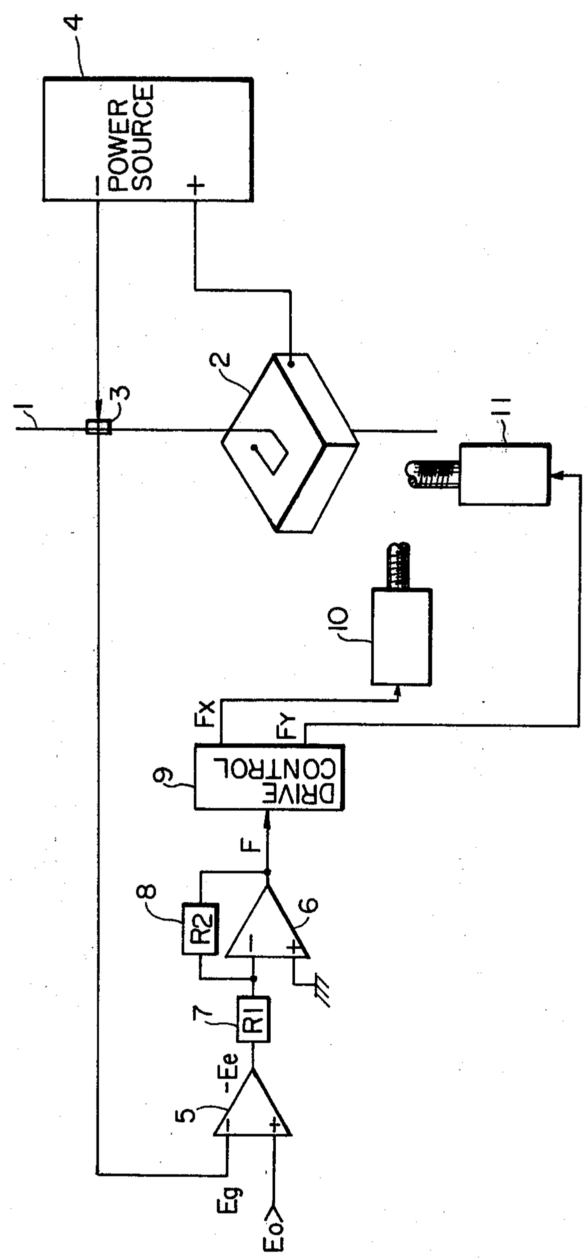
FIG. 1 is a schematic circuit diagram showing a example of conventional apparatus for performing electric discharge machining with a wire-shaped electrode.
Figure 2:
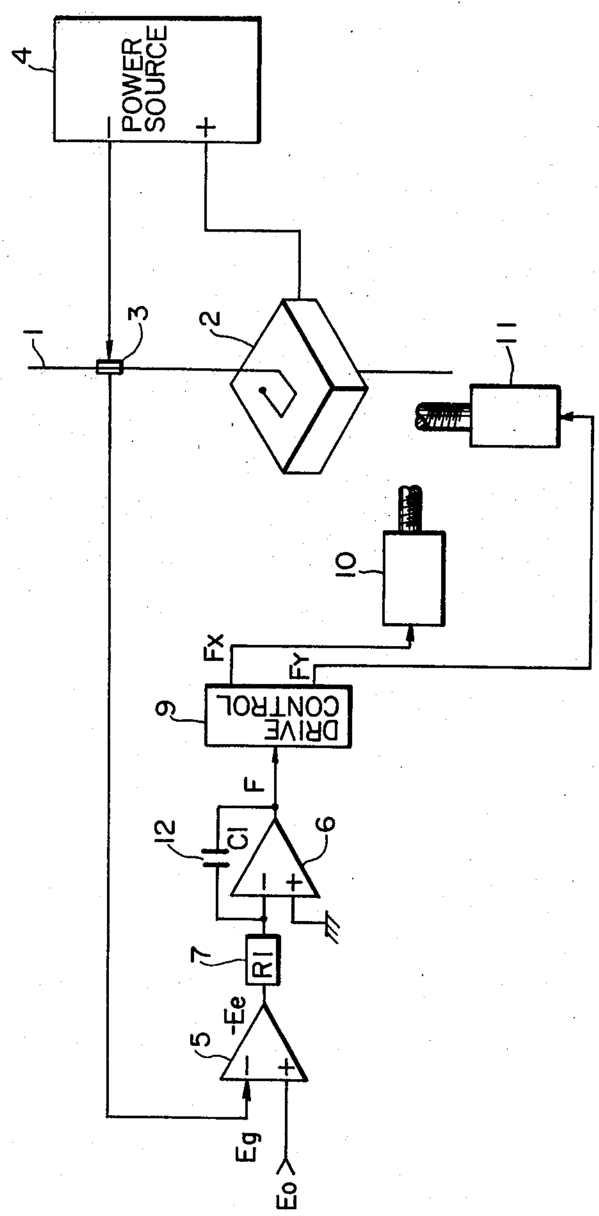
FIGS. 2 through 5 are schematic circuit diagrams showing first through the third preferred embodiments of an apparatus for performing electric discharge machining with a wire-shaped electrode constructed according to the present invention.

In view of the above drawbacks accompanying the conventional apparatus as shown in FIG. 1, the invention provides an apparatus for performing electric discharge machining with a wire-shaped electrode as shown in FIG. 2. In this first embodiment, the operational amplifier used in the apparatus of FIG. 1 is replaced by an integrator circuit to make the loop gain substantially infinite thereby resulting in stable machining. In FIG. 2, components that are common to those shown in FIG. 1 bear the same reference numerals.

In the embodiment of FIG. 2, the resistor 8 used in the circuit of FIG. 1 is replaced by an integrating capacitor 12. The electric current flowing through the integrating capacitor 12 is defined by $E_e/R_1$. With the capacitance of the capacitor 12 represented by $C_1$, the output voltage of the operational amplifier 6 can be expressed:

$$F = \int \frac{E_e}{R_1 \cdot C_1} dt = \frac{1}{R_1 \cdot C_1} \int E_e dt \tag{4}$$

It should be noted that the table speed F is constant in a stable state. Therefore, the integrated value in the above expression (4) is constant. Accordingly, the integrated value of $E_e$ is zero when the system is in the stable state. That is, the average of $E_e$ is zero and the gap voltage $E_g$ during the machining precisely follows the reference voltage $E_O$. In other words, since a constant gap length is always maintained, the machining operation can be carried out with extremely high accuracy.

More specifically, a capacitor exhibits an infinite impedance in the stationary state, that is, with respect to a d.c. signal. Accordingly, the resistance value of the resistor 8 shown in FIG. 1 is made essentially infinite by the function of the capacitor which is substituted therefor and thus in the steady state, the circuit gain becomes infinite resulting in minimization of the error voltage $E_e$.

Further, a capacitor exhibits a low impedance with respect to a transient signal. Thus, the transient gain, which determines whether or not a system is in stable condition, is small resulting in the system maintaining a very stable condition. This means that, even if the error voltage momentarily changes, since the integrated value does not follow directly the changes in the error voltage, the table speed is maintained nearly constant to thereby achieve stable machining.

Figure 3:
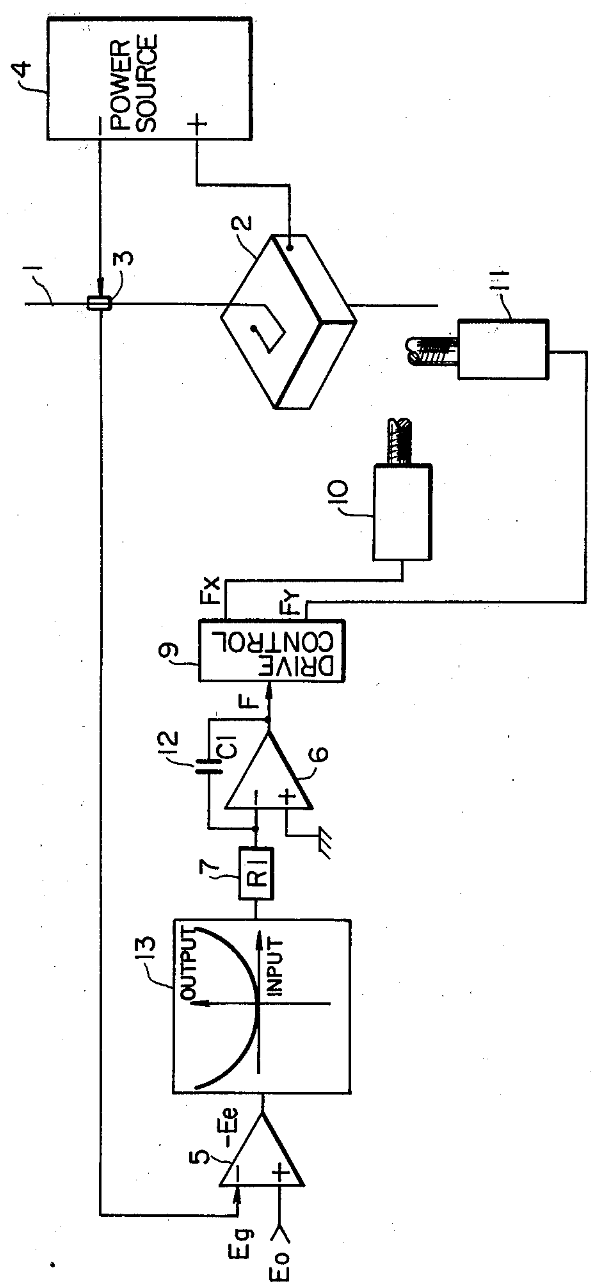

FIG. 3 is a schematic circuit diagram showing a second preferred embodiment of an apparatus for electric discharge machining with a wire-shaped electrode constructed according to the present invention. The second embodiment shown in FIG. 3 includes a non-linear amplifier 13 operatively coupled between an error voltage amplifier 5 and the resistor 7 and which has an input-output characteristic such that the output voltage thereof increases abruptly as the input voltage increases. An integrator circuit composed of an operational amplifier 6 and a capacitor 12 are coupled between the resistor 7 and the input to the drive control circuit 9. Because of the presence of the non-linear amplifier 13, the period of time required for the table speed to become constant is made very short. Such a non-linear amplifier may be constructed with an operational amplifier connected to follow the i-v characteristic of a diode which is by itself a well-known construction.

With this construction, when the apparatus is in a transient state before reaching stable state, the error voltage $E_e$ is at a relatively large value, and therefore the output voltage from the non-linear amplifier 13 is at an extremely high level. As a result, the integrating capacitor 12 is momentarily charged at which point the table speed is constant. For operation in the stable state, the time average of the error voltage $E_e$ can be regarded as zero in the event of an instantaneous change in the error voltage $E_e$ caused by a disturbance, since the input voltage of the non-linear amplifier 13 is small, the output voltage thereof is extremely small. Consequently, the variation in the integrator output is extremely small so that the table speed is maintained in a stable condition.

When the reference voltage $E_o$ is set at a value higher than the gap voltage $E_g$ for a long period of time such as may be caused by a short-circuit or stalled condition during machining, a negative voltage value may be present at the output of the integrator circuit. In such a case, even if the short-circuit is removed, a relatively long period of time is required for inverting the polarity of the integrator circuit output to return to a positive value. During such a long period, the movement of the table is interrupted, and thus the workpiece is subjected to an undesired, excessive electric discharge machining operation. This causes a longitudinal trace to be formed on the machined surface of the workpiece. The third embodiment of the present invention shown in FIG. 4 eliminates the possibility of such a difficulty. The third embodiment is constructed by connecting a diode 14 in parallel with the integrating capacitor 12. In the third embodiment, because of the directional characteristics of the diode 14, the voltage across the integrating capacitor 12 is prevented from becoming negative.

Figure 4:
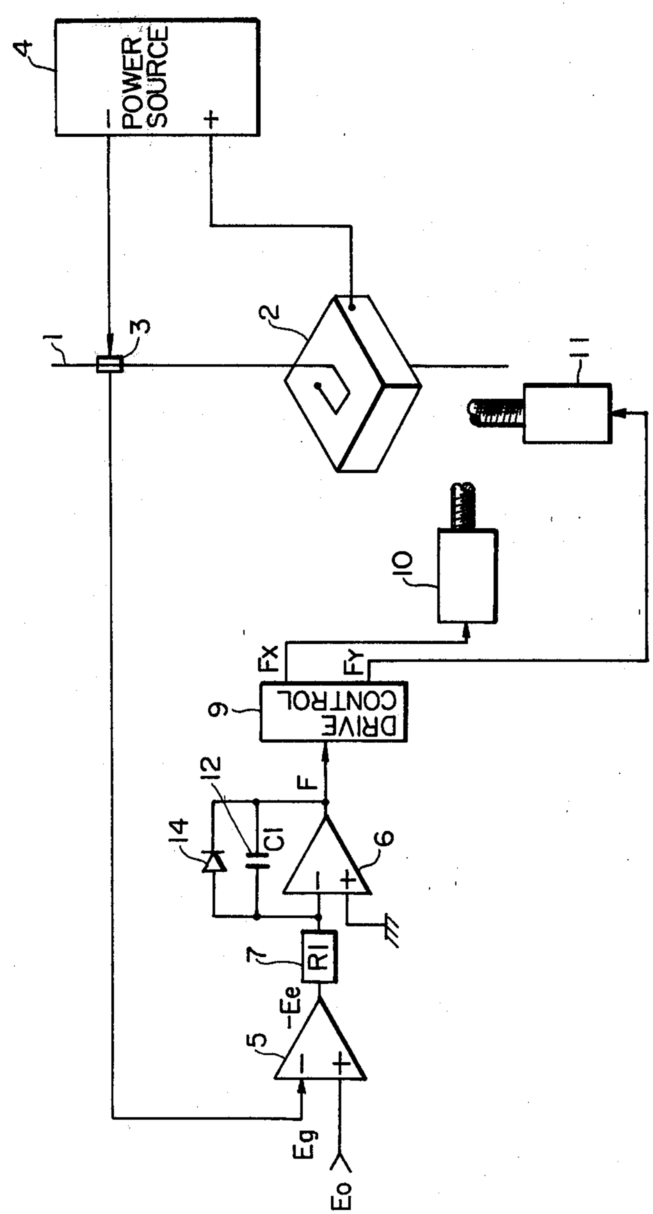
Figure 5:
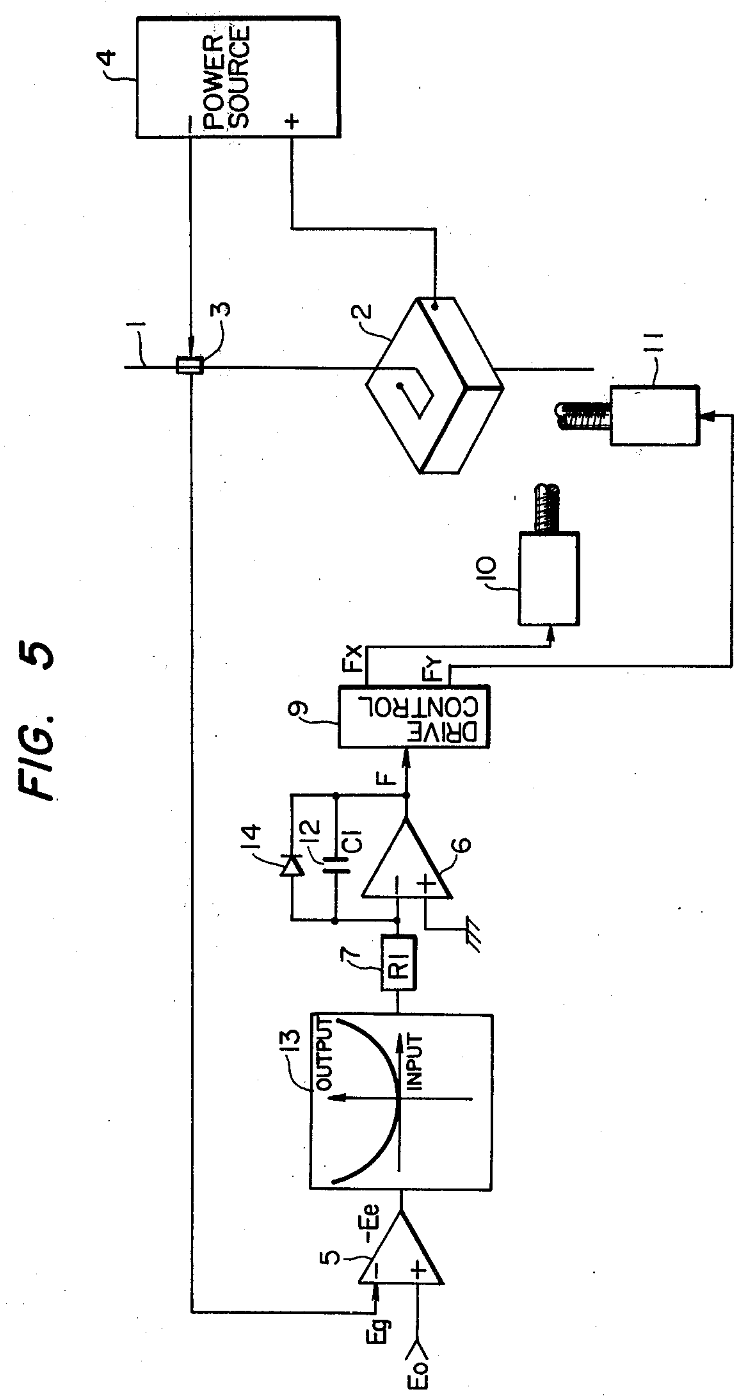

With the third embodiment shown in FIG. 4, immediately after the short-circuit is removed, the table carrying the workpiece starts moving. This results in an improvement in the machining speed and an improved accuracy in machining. The non-linear amplifier used in the second embodiment shown in FIG. 3 can be used with the diode-shunted integrator circuit of the third embodiment shown in FIG. 4. This results in a fourth embodiment of the invention shown in FIG. 5. It is clear from the above description that the performance of the apparatus for electric discharge machining with a wire-shaped electrode which employs an integrator circuit to eliminate drawbacks accompanying the conventional apparatus can be further improved by additionally providing both a non-linear amplifier and a clamping diode.

Figure 6:
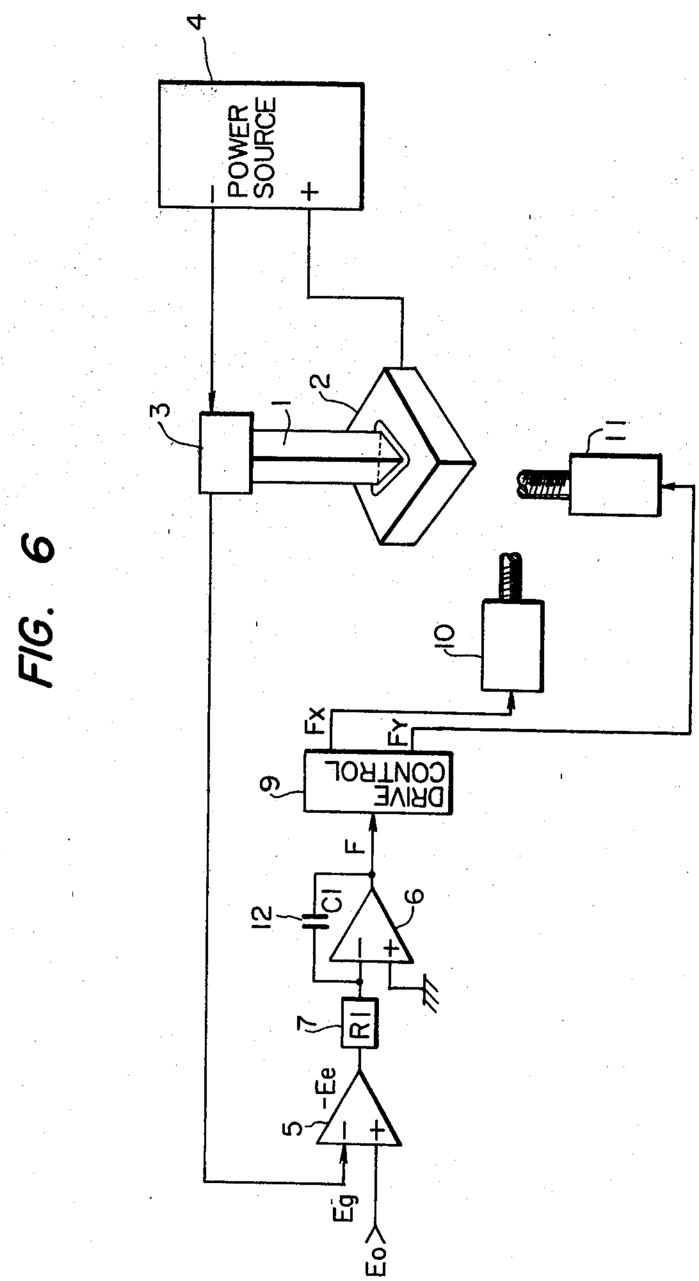
FIG. 6 is a schematic circuit diagram showing a preferred embodiment of an apparatus for performing electric discharge machining with not a wire-shaped electrode but an ordinary electrode.

While the above description relates to apparatuses for electric discharge machining with a wire-shaped electrode, modifications thereof are possible without departing from the essential scope of the invention. Namely, the wire-shaped electrode may be replaced by a conventional electric discharge machining electrode. An apparatus employing a conventional electrode instead of the above-described wire-shaped electrode is shown in FIG. 6. In this embodiment, a triangle pole is used as an electrode. The other circuit components are identical to those of FIG. 3.

Furthermore, in the above described preferred embodiments, while the integrator circuit, the non-linear amplifier and the clamping circuit for clamping the integrator output voltage are constituted by electronic elements such as an operational amplifier, a diode and the like, in the case where an electronic processor is employed as a control device for the apparatus, the above-described integrator function, the non-linear amplifier function and the clamping function for the integrated value can be performed by the processor.

What is claimed is:

1. An electric discharge machining apparatus for cutting and shaping a workpiece into an article having a desired configuration comprising:

an electrode movable relative to said workpiece with a cutting gap being formed between said electrode and said workpiece;

means for applying an electric current to said electrode, said current flowing through said cutting gap;

means for moving said electrode and said workpiece relative to one another to cut and shape said workpiece into a desired configuration;

comparator means for comparing the voltage across said cutting gap with a reference voltage to produce an error voltage signal;

means for integrating said error voltage signal to produce an output control signal;

means for controlling the speed of said electrode relative to said workpiece in accordance with said output control signal of said integrating means; and means for maintaining the output of said integrating means at a substantially zero level when the integrated value shifts towards a negative value.

2. The apparatus as defined in claim 1 wherein said integrating means comprises an integrating capacitor, and wherein said means for maintaining the output of said integrating means at a substantially zero level comprises a clamping diode connected in parallel with said integrating capacitor.

3. The apparatus as defined in claims 1 or 2 further comprising:

a non-linear amplifier coupled between said comparator means and said integrating means, said amplifier having a fast response characteristic with respect to said error voltage signal, the output of said amplifier being coupled to be integrated by said integrating means.

4. The apparatus as defined in claims 1 or 2 wherein said electrode is a wire-shaped electrode.

* * * * *